United States Patent [19]
Schwärzler

[11] 3,820,472
[45] June 28, 1974

[54] TWO-SIDED LINEAR INDUCTION MOTOR ESPECIALLY FOR SUSPENDED VEHICLES

[75] Inventor: Peter Schwärzler, Furstenfeldbruck, Germany

[73] Assignee: Krauss-Maffei Aktiengesellschaft, Munich, Germany

[22] Filed: Jan. 16, 1973

[21] Appl. No.: 324,150

[30] Foreign Application Priority Data
Jan. 17, 1972  Germany............................ 2202052

[52] U.S. Cl............................. 104/148 LM, 310/13
[51] Int. Cl. ............................................ H02k 41/02
[58] Field of Search ............................. 310/12–14; 318/135; 104/148 LM, 148 R

[56] References Cited
UNITED STATES PATENTS

| | | | |
|---|---|---|---|
| 782,312 | 2/1905 | Zehden................................ | 310/13 |
| 2,412,511 | 12/1946 | Jones................................... | 310/13 |
| 2,519,253 | 8/1950 | Jones................................... | 310/13 X |
| 3,707,924 | 1/1973 | Barthalon et al............ | 104/148 LM |

*Primary Examiner*—D. F. Duggan
*Attorney, Agent, or Firm*—Karl F. Ross; Herbert Dubno

[57] ABSTRACT

A magnetically suspended vehicle is provided with a two-sided linear induction motor having a central winding structure or assembly flanked by a pair of rails magnetically cooperating with the winding structure for propelling the vehicle. The rails of ferromagnetic material are coated with a layer of high electrical conductivity along their faces turned toward the winding structure.

9 Claims, 3 Drawing Figures

TWO-SIDED LINEAR INDUCTION MOTOR ESPECIALLY FOR SUSPENDED VEHICLES

CROSS-REFERENCE TO RELATED APPLICATIONS

The present application is related to the commonly assigned copending applications:

Ser. No. 268,132 filed 30 June 1972 and entitled ELECTROMAGNET SYSTEM AND GUIDE SYSTEM FOR MAGNETICALLY SUSPENDED VEHICLES;

Ser. No. 268,133 filed 30 June 1972 and entitled ELECTROMAGNET SUSPENSION AND DRIVE MEANS;

Ser. No. 280,073 filed 11 Aug. 1972 and entitled SUSPENSION AND/OR GUIDE SYSTEM ESPECIALLY FOR MAGNETICALLY SUSPENDED VEHICLES (now U.S. Pat. No. 3,780,668 issued 25 Dec. 1973);

Ser. No. 280,074 filed 11 Aug. 1972 entitled ELECTROMAGNET SUSPENSION AND GUIDE SYSTEM PARTICULARLY FOR VEHICLES; and Ser. No. 292,638 filed 27 Sept. 1972 and entitled SYSTEM FOR HIGH-SPEED ELECTRICALLY OPERATED VEHICLES.

FIELD OF THE INVENTION

The present invention relates to a double-sided linear induction motor especially for magnetically suspended vehicles and, more particularly, to a motor system for propelling vehicles along a track, e.g., a track supported above ground and from which the vehicle is suspended with a minimum of frictional interaction between vehicle and track.

BACKGROUND OF THE INVENTION

Linear induction motors have been used heretofore for vehicle propulsion in systems for the transport of passengers and freight within urban areas, between urban areas and in or through rural areas, replacing wheel-driving rotary motors for these purposes.

A linear induction motor generally comprises a coil structure or winding assembly carried by the vehicle and juxtaposed with a rail of ferromagnetic material mounted upon and fastened to the track so that a magnetic path is closed through this rail and, with appropriate energization of the winding assembly, develops a magnetic force component in the direction of vehicle propulsion.

Such propulsion systems have been found to be of increasing interest because they eliminate the need for rotors, bearings for rotatably journaling such rotors and mechanical drive trains between the rotor and a propelling means. Furthermore, they eliminate the need for frictional interengagement of the vehicle and a track as is required when the rotor must drive a wheel or a gear to effect displacement of the vehicle.

In conventional double-sided linear induction motors, there are provided two coils or winding assemblies, hereinafter referred to as stator windings, between which a rail of ferromagnetic material is disposed. In other words, the stator windings flank the rail.

A disadvantage of this arrangement resides in the fact that substantially all of the ferromagnetic material (iron) of the motor, in practice, must be carried by the vehicle. While this does not amount to a significant difficulty when the vehicle is supported on wheels or the like, any increase in weight of a magnetically suspended vehicle requires a compensatory increase in the magnetic-field strength of the suspension magnets, thereby requiring either an increase in the supplied electric current or an increase in the number of turns of the electromagnetic winding. The latter further increases the weight of the vehicle and may reduce the load-carrying capacity, while the former necessitates an increase in the cost and complexity of the control circuitry.

One-sided linear induction motors are, of course, known in which the stator is juxtaposed with a rail of conductive material. However, this system provides an unsymmetrical drive to a vehicle carrying the windings and has not proved to be satisfactory in all cases in which magnetic suspensions are provided because two such motor arrangements must be provided upon the vehicle and/or two rails disposed along the track to afford the desired symmetry. Also such one-sided arrangements create lateral force components which create problems in lateral guidance and centering of the vehicle on the track.

OBJECTS OF THE INVENTION

It is the principal object of the present invention to provide a double-sided linear induction motor in which the aforementioned disadvantages can be obviated and which is particularly suitable for use in magnetically suspended vehicles of the type described in the aforementioned copending applications.

Another object of the invention is to provide a double-sided linear induction motor which has a high ratio of efficiency (ratio of electric power input to mechanical-propulsion power) to supported weight.

Still another object of the invention is to provide an improved linear induction motor of simplified construction.

Yet another object of the invention is to provide a linear induction motor having a low transverse-force component applied to the movable member thereof.

SUMMARY OF THE INVENTION

These objects and others which will become apparent hereinafter are attained, in accordance with the present invention, in a linear induction motor of a double-sided type which comprises a central coil assembly flanked by and magnetically interacting with a pair of reaction rails extending longitudinally along opposite sides of the coil member and composed of ferromagnetic material carrying at least a coating layer of high electrical conductivity and confronting the coil-carrying member.

For the purposes of this disclosure, the term "stator" will be used to describe the coil-carrying member which constitutes, according to the present invention, a longitudinally extending stack of coils oriented horizontally and received between a pair of reaction rails of ferromagnetic material, the coils of the stack or packet being spaced longitudinally apart in the direction in which the rails extend and lying in respective vertical planes perpendicular to the rails. It will be appreciated that, in linear induction motors of the present type for use in magnetically suspended vehicles, the stator stack is mounted upon the vehicle which is adapted to travel in a generally horizontal direction, i.e., parallel to the longitudinal axis of the stack and perpendicular to the planes of the coils which are mirror-symmetrically disposed on opposite sides of a vertical median plane of symmetry through different axes and in the direction of travel of the vehicle. Hence the term "stator" as used here is not intended to apply to a stationary member, but rather to the member which in linear induction motors has heretofore denominated a moving-field coil, an excitation winding, a linear armature or the like. The conductive layers of the rails may be energized by any source in accordance with linear induction motor principles and the coils may be excited using wipers carried by the vehicle and contacting current-carrying rails mounted along the track to produce a moving or traveling field closing through the ferromagnetic masses constituting the reaction rails.

Since the greater part of the ferromagnetic material with which the coils magnetically cooperate is contained in the reaction rails, it is mounted upon the stationary track along which the vehicle travels and need not be supported by the magnetic suspension means. Consequently, the weight of the stator carried by the vehicle is relatively low and, in effect, can be considered to be only the weight of the coil assembly. Moreover, the relatively light weight of the coil assembly permits the structure mounting same on the vehicle to be of relatively light weight, low strength and small size.

The increase in the cost of the track is not significant, especially when the track network is used to operate a larger number of passenger-carrying vehicles which otherwise would require relatively massive motor parts.

According to another feature of the invention, the elongated stator stack or packet is subdivided into a pair of segments perpendicularly to the reaction rails with nonmagnetic spacers which define longitudinally spaced laterally open grooves in which the coils are received. This has veen found to facilitate mounting of the coils and cooling of the stator assembly in a particularly efficient manner. Furthermore, when the ferromagnetic or stator-iron members are constructed, as is desirable, as laminates of sheet-iron lamellae, the lamellae may be of simple rectangular outline, thereby making manufacture of the stator assemblies relatively simple and of low cost. The laminated blocks of stator iron, of course, can be separated accurately by the spacers and advantageously project laterally therebeyond in vertical planes transverse to the direction of movement of the vehicle to form the grooves.

It has also been found to be advantageous to provide at least two pairs of longitudinally spaced grooves on opposite sides of the stator assembly with respective coils (at least two) wound and excited to generate a traveling magnetic field which extends transversely through the stator in one direction and through the stator in the opposite direction at longitudinally spaced locations and closes through the reaction rails to effect propulsion of the vehicle.

DESCRIPTION OF THE DRAWING

The above and other objects, features and advantages of the present invention will become more readily apparent from the following description, reference being made to the accompanying drawing in which.

SPECIFIC DESCRIPTION

Figure 3:
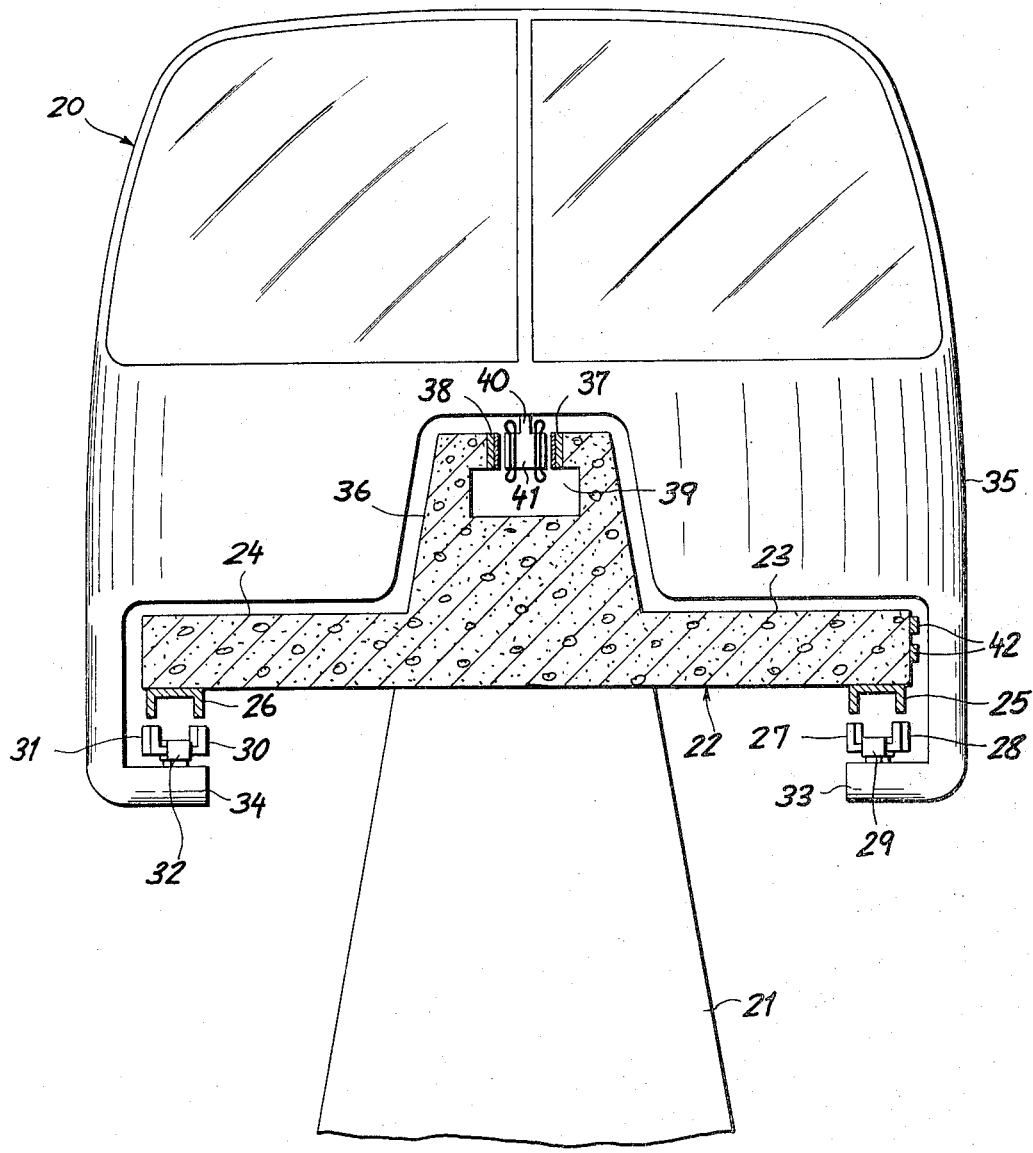
FIG. 3 is a vertical section through a track structure embodying the present invention and showing, in end elevation, a magnetically suspended vehicle according to the invention.

Referring first to FIG. 3, it will be seen that a magnetically suspended vehicle system, according to the present invention, may comprise a vehicle 20 adapted to ride along a T-profile track 22 supported at spaced-apart locations by pylons 21.

The track has a pair of lateral horizontal flanges 23, 24 to the undersides of which are affixed a pair of U-section armature rails 25, 26 of magnetically attractable material, i.e., iron. Juxtaposed with these armature rails are electromagnetic members carried by the vehicle body 35 which is formed for this purpose, with a pair of downwardly extending aprons 33 and 34 having inwardly turned flanges overlying the armature rails 25 and 26. Each apron carries a row of electromagnets 27, 28 and 30, 31, provided with electromagnetic coils 29 and 32 as described in the aforementioned copending applications Ser. Nos. 268,132, 268,133, 280,073 and 280,074. (See also application Ser. No. 362,012 filed May 21, 1973, entitled ELECTROMAGNETIC SUSPENSION AND GUIDE SYSTEM FOR SUSPENDED VEHICLES ADAPTED TO SWITCH TRACKS).

In the embodiment illustrated, the electromagnets are disposed along rows perpendicular to the plane of the paper in FIG. 3 and generally in the direction of travel of the vehicle with the electromagnet cores 27, 28 and 30, 31 mutually and alternately offset laterally so that the upwardly turned pole pieces are disposed alternately to one side and the other of the corresponding downwardly turned pole pieces of the armature rail. The coils 29 and 32 are energized from the current-carrying rails 42 by a contact system as described in application Ser. No. 292,638, mentioned earlier, so that an attractive magnetic force spans the air gaps between the electromagnet cores 27, 28, 30, 31 and the respective armature rails 25 and 26. Because of the offset arrangement of the electromagnet cores, each magnetic field has an upward force component in the vertical direction and a horizontal force component to the right or to the left, depending upon the direction of offset, providing the magnetic suspension force supporting the vehicle 20 upon the track 22 and, at the same time, centering the vehicle during travel against transverse forces resulting from wind or centrifugal action.

Figure 1:
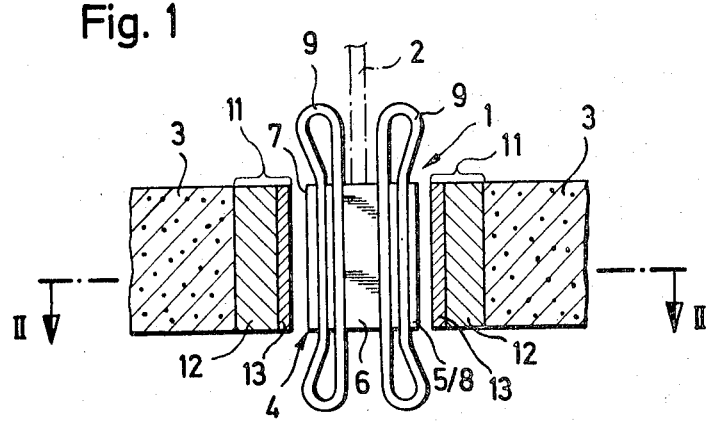
FIG. 1 is a transverse cross-sectional view through a linear induction motor embodying the present invention (the section being taken along line I — I of FIG. 2)
Figure 2:
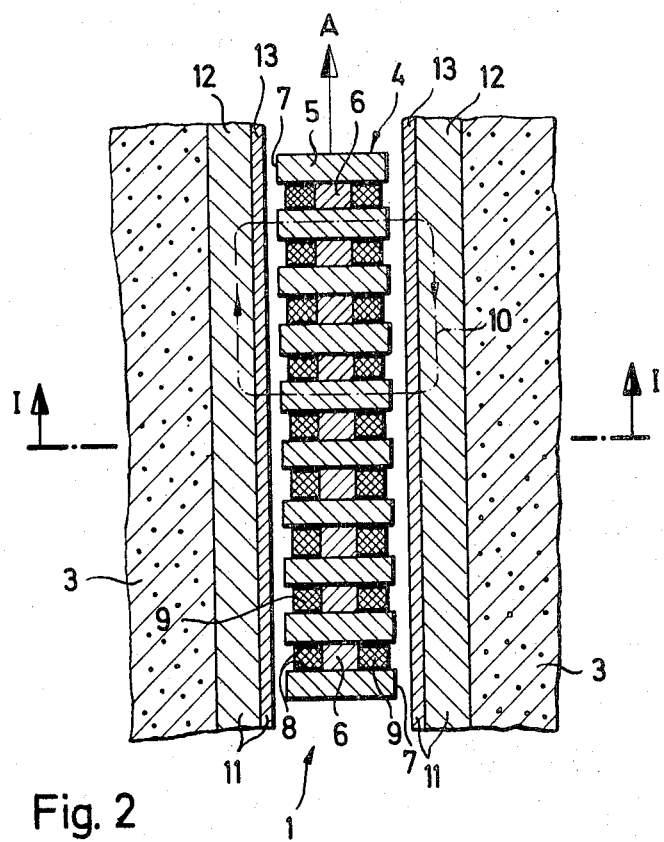
FIG. 2 is a cross-section taken along the line II — II of FIG. 1.

The vehicle 20 is driven by a double-sided linear induction motor whose stator assembly 41 is constructed as described in in connection with FIGS. 1 and 2, carried by an upright 40 and flanked by a pair of reaction rails 37 and 38 defining a channel 39 in an upwardly extending rib 36 of the track. The rails 37 and 38 are of course constructed as described for the rails 11 of FIGS. 1 and 2.

In FIGS. 1 and 2 there has been illustrated a linear induction motor which comprises a central stator assembly 1 which is connected by posts or a web 2, illustrated in dot-dash lines, with a vehicle body not illustrated in FIGS. 1 and 2 but which may have the configuration shown in FIG. 3 or as illustrated in any of the aforementioned copending applications. The vehicle is electromagnetically suspended upon a track 3.

A longitudinally extending stator stack 4 of the stator is subdivided in the longitudinal direction into individual stack segments 5, each of which may be of rectangular outline (see FIG. 1) and can be composed of a laminated pack of rectangular iron sheets, the spacing between the segments 5 being maintained by centrally disposed non-magnetic spacers 6.

The spacers 6 are set back laterally from the longitudinal side faces 7 of the sheet-iron stack 5 to define between each pair of sheet-iron stacks 5 a pair of grooves or channels 8 respectively opening laterally outwardly. The grooves 8 are provided with two polyphase alternating current windings or coils 9 (rotating field coils) which electrically constitute a single stepped coil with an odd number of poles and can be excited as described to generate a moving field 10 (traveling field) as represented in dot-dash lines counter to the longitudinal direction of movement A of the vehicle. The moving field 10, which is represented is only an instantaneous depiction of one configuration of the field produced by the excited coils, closes through a pair of sheet-iron packets 5 in a direction transverse to the direction of movement and through the reaction rail 11.

The coil assembly 1 is disposed between two parallel reaction rails 11 disposed on edge (in vertical planes parallel to the direction of vehicle travel) upon the track 3. The guide and suspension system, as described in connection with FIG. 3, maintains a substantially constant air gap between both grooved longitudinal flanks 7 of the coil assembly and the reaction rails 11. Each of the reaction rails 11 comprises a soft-magnetic iron portion 12 and, along the face of this member 12, a layer 13 of aluminum or copper forming a high conductive strip juxtaposed with the coil portions. The iron members 12 form a magnetic path transversed by the moving field 10 which may interact with electric current flow through the conductive metal strips 13 in the usual manner. The transverse thickness of the ferromagnetic bars 12 is substantially greater (say, 3 to 20 times) than that of the bank 13.

I claim:

1. A double-sided linear induction motor comprising a central coil assembly, and a pair of reaction rails flanking said assembly and extending longitudinally in parallel relationship on opposite sides thereof, each of said reaction rails comprising a member of ferromagnetic material, and a respective layer of high electrical conductivity disposed on each of said members and confronting said coil assembly, said coil assembly extending longitudinally between said reaction rails and being longitudinally subdivided into a plurality of unitary magnetic core segments of block shape generally perpendicular to the longitudinal direction by nonmagnetic spacers defining longitudinally spaced grooves opening in opposite directions toward said reaction rails, each of said segments having opposite faces respectively juxtaposed with said layers, said coil assembly being provided with coils received in said grooves and generating a traveling magnetic field extending longitudinally through said members and transversely through pairs of said segments while closing through said members.

2. A linear induction motor defined in claim 1 wherein said coils include two coils received in corresponding longitudinally spaced coils grooves on opposite sides of said assembly.

3. The linear induction motor defined in claim 3 wherein said segments are each rectangular stacks laminated from sheet-iron lamella projecting laterally beyond said spacers in the direction of said reaction rails and defining said grooves between them.

4. A vehicle system provided with the motor defined in claim 4 and comprising a track formed with said reaction rails, at least one vehicle movable along said track in the direction in which said rail extends, and means mounting said assembly upon said vehicle.

5. The system defined in claim 5, further comprising means on said track and on said vehicle for magnetically supporting said vehicle on said track across at least one air gap spanned by a magnetic field.

6. The system defined in claim 6 wherein the last-mentioned means includes a pair of armature rails extending in said direction and spaced apart transversely thereto, respective rows of electromagnets extending in said direction and fixed to said vehicle, said electromagnets having cores spacedly juxtaposed with said armature rails, and means including said electromagnet for laterally positioning said vehicle relative to said reaction rails to maintain substantially constant-width air gaps between said assembly and said layer.

7. The system defined in claim 7 wherein said members are composed of soft magnetic iron and said layers are composed of aluminum or copper.

8. The system defined in claim 8 wherein said reaction rails are disposed centrally of said track between said armature rails and said assembly is mounted along a vertical median plane of said vehicle.

9. The system defined in claim 9 wherein each of said reaction rails comprises a flat bar of said soft magnetic iron and lies in a respective vertical plane parallel to the direction of vehicle travel.

* * * * *